(12) United States Patent
Chen

(10) Patent No.: US 6,199,227 B1
(45) Date of Patent: Mar. 13, 2001

(54) UNIVERSAL JOINT FOR A SHOWER HEAD

(76) Inventor: Te-Sen Chen, No. 31, Alley 52, Lane 81, Shan-Chung St., Jang-Hua City (TW)

( * ) Notice: Subject to any disclaimer, the term of this patent is extended or adjusted under 35 U.S.C. 154(b) by 0 days.

(21) Appl. No.: 09/496,048

(22) Filed: Feb. 2, 2000

(51) Int. Cl.[7] ....................................... A47K 3/22
(52) U.S. Cl. ........................... 4/615; 239/587.1; 285/281; 285/354
(58) Field of Search .................. 4/615, 567, 568, 4/569, 570; 239/587.1; 285/278, 280, 281, 248, 249, 354, 110; 277/392, 394, 314, 315, 602, 603, 613, 625, 626, 641, 926, 614, 381, 384, 353, 395, 481, 491, 530; 137/798

(56) References Cited

U.S. PATENT DOCUMENTS

| | | | |
|---|---|---|---|
| 351,828 | * | 11/1886 | Bushnell . |
| 2,903,281 | * | 9/1959 | Avery . |
| 3,090,320 | * | 5/1963 | Hummer et al. . |
| 3,447,819 | * | 6/1969 | Borsum et al. . |
| 4,303,201 | * | 12/1981 | Elkins et al. ........................ 239/383 |
| 4,589,688 | * | 5/1986 | Johnson ............................. 285/354 |
| 5,364,134 | * | 11/1994 | Anderson .......................... 285/354 |
| 6,050,508 | * | 4/2000 | Fan .................................. 239/587.1 |

* cited by examiner

*Primary Examiner*—Henry J. Recla
*Assistant Examiner*—Khoa D. Huynh
(74) *Attorney, Agent, or Firm*—Rosenberg, Klein & Lee

(57) ABSTRACT

A universal joint for a shower head includes a water tube with an end coupler secured to an end thereof, the end coupler including an annular groove in an outer periphery thereof. A fitting includes a stop flange on a first end of an inner periphery thereof and a threading defined in a second end of the inner periphery thereof. The fitting is mounted around the end coupler and the end of the water tube with the threading of the fitting engaged with an end of the shower head. An anti-leak washer is mounted in the annular groove of the end coupler and in sealing contact with the inner periphery of the fitting. A sleeve is mounted between the end of the water tube and the fitting and bears against the stop flange of the fitting.

3 Claims, 5 Drawing Sheets

UNIVERSAL JOINT FOR A SHOWER HEAD

BACKGROUND OF THE INVENTION

1. Field of the Invention

The present invention relates to a joint for a shower head, and more particularly to a universal joint for a shower head.

2. Description of the Related Art

FIGS. 4 and 5 of the drawings illustrates a conventional joint for a shower head, wherein a fitting 22 is used to connect an end coupler 21 of a water tube 20 to a shower head 24. An inner periphery of the fitting 22 includes a stop flange on an end thereof and a threading defined in the other end thereof for connecting with an end of the shower head 24. An anti-leak washer 23 is mounted between the end coupler 21 of the water tube 20 and the end of the shower head 24. Nevertheless, relative free rotational movement between the shower head 24 and the end coupler 21 of the water tube 22 is not allowed, since the rubber 23 is made of rubber and thus has a relatively large friction. As a result, inconvenience occurs during use of the shower head. In addition, the anti-leak washer 23 is apt to wear due to relative twist between the shower head 24 and the water tube 20. Furthermore, the water tube 22 tends to be damaged by end edge of the fitting 22 when the fitting 22 is bent relative to the water tube 20.

SUMMARY OF THE INVENTION

It is a primary object of the present invention to provide a universal joint for a shower head that is durable and convenient to use.

A universal joint for a shower head in accordance with the present invention includes:
- a water tube with an end coupler secured to an end thereof, the end coupler including an annular groove in an outer periphery thereof;
- a fitting including a stop flange on a first end of an inner periphery thereof and a threading defined in a second end of the inner periphery thereof, the fitting being mounted around the end coupler and the end of the water tube, the threading of the fitting being adapted to be engaged with an end of the shower head;
- an anti-leak washer mounted in the annular groove of the end coupler and in sealing contact with the inner periphery of the fitting; and
- a sleeve mounted between the end of the water tube and the fitting, the sleeve bearing against the stop flange of the fitting.

The sleeve includes a second stop flange on an outer periphery thereof for bearing against the stop flange of the fitting. The sleeve includes an end having an outer diameter smaller than an inner diameter of the first end of the fitting, thereby allowing the end of the sleeve to be extended beyond the first end of the fitting. The anti-leak washer is conic and includes a relatively larger end face, and an annular groove is defined in the relatively larger end face.

By such an arrangement, the shower head and the water tube are freely rotatable relative to each other to provide convenient use. In addition, the anti-leak washer is mounted in the annular groove of the end coupler to prevent wear to the anti-leak washer during rotation of the shower head. In addition, the sleeve is mounted between the fitting and the water tube to prevent wear to the water tube by the fitting. Further, extension of the sleeve out of the fitting prevents the water tube to be damaged by end edge of the fitting.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
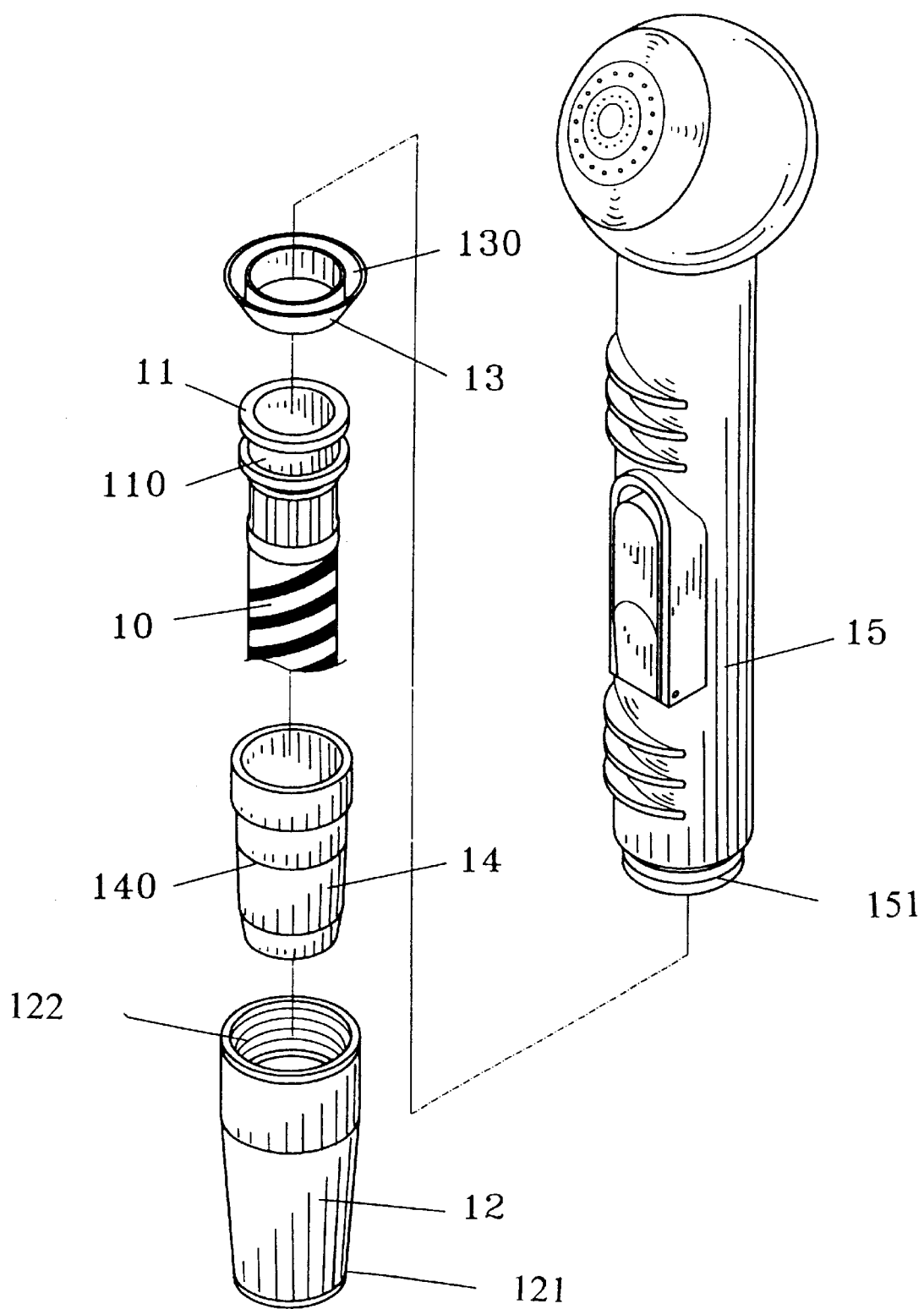
FIG. 1 is an exploded perspective view of a shower head and a universal joint in accordance with the present invention.
Figure 2:
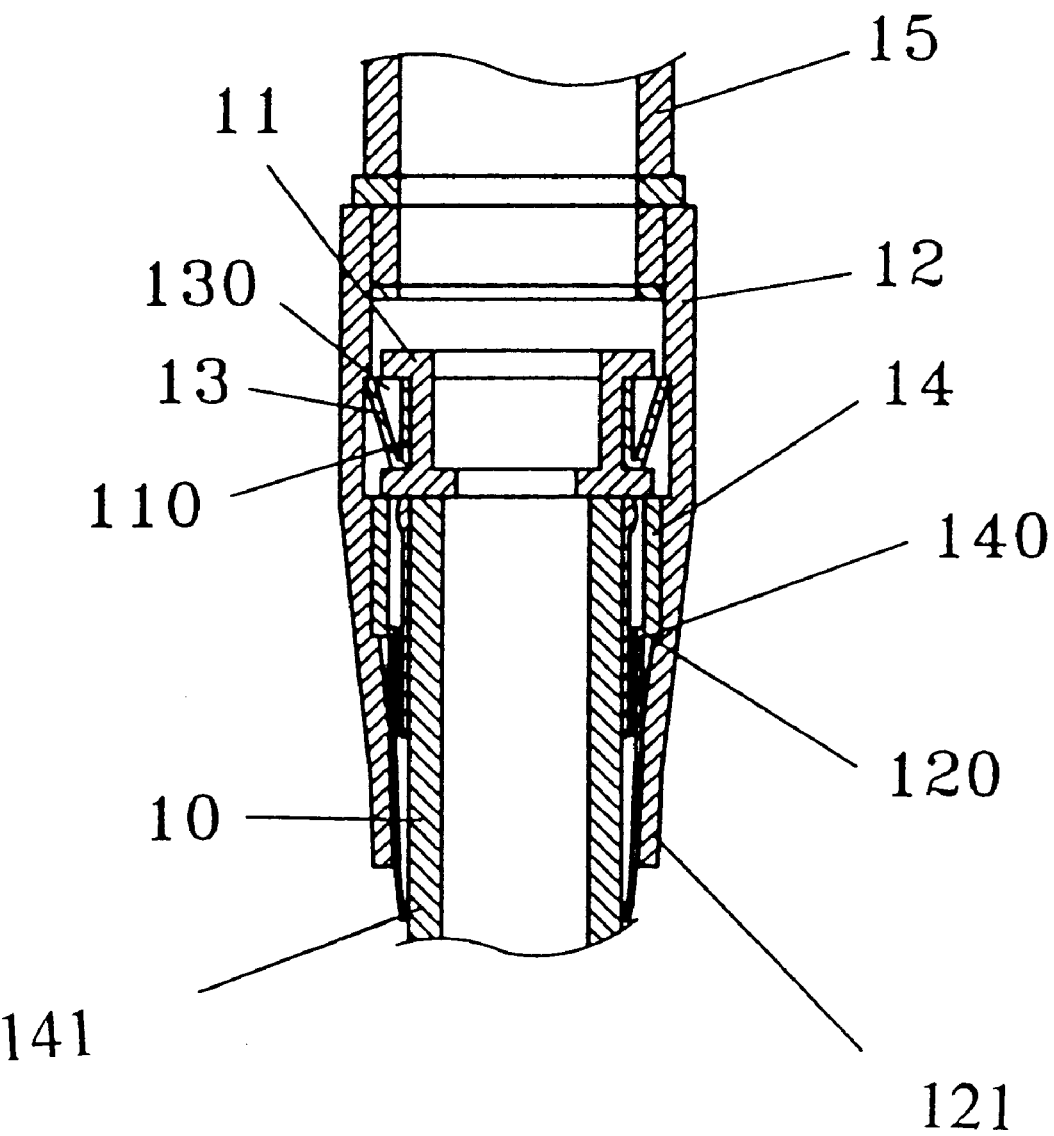
FIG. 2 is a partial longitudinal sectional view illustrating the universal joint and a portion of the shower head.
Figure 3:
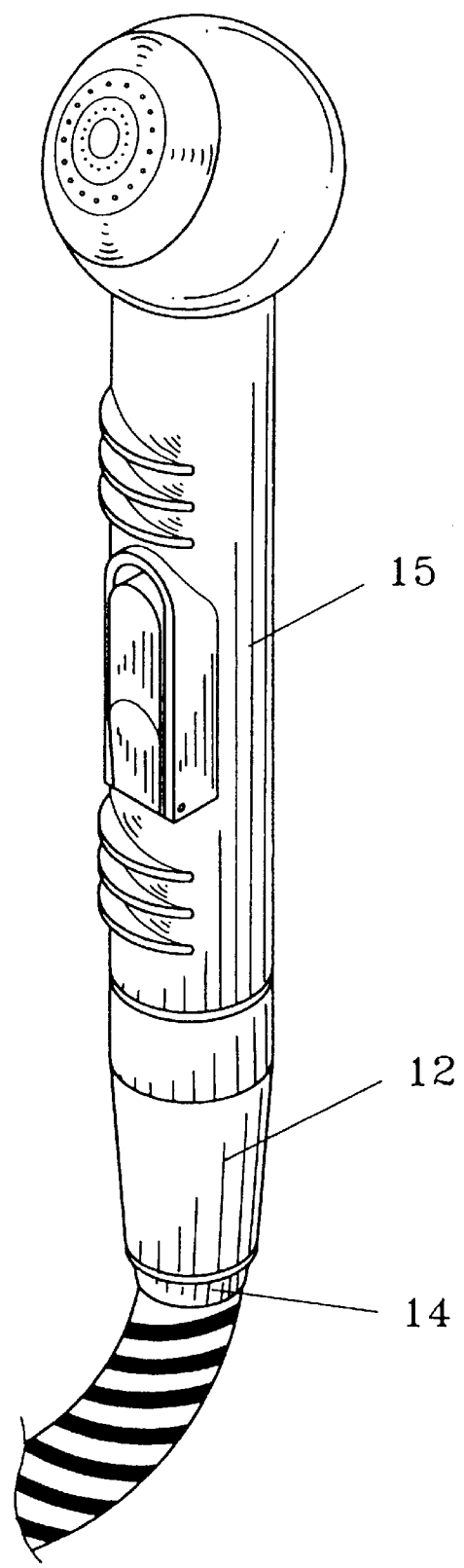
FIG. 3 is a perspective view of the shower head and the universal joint in accordance with the present invention.
Figure 4:
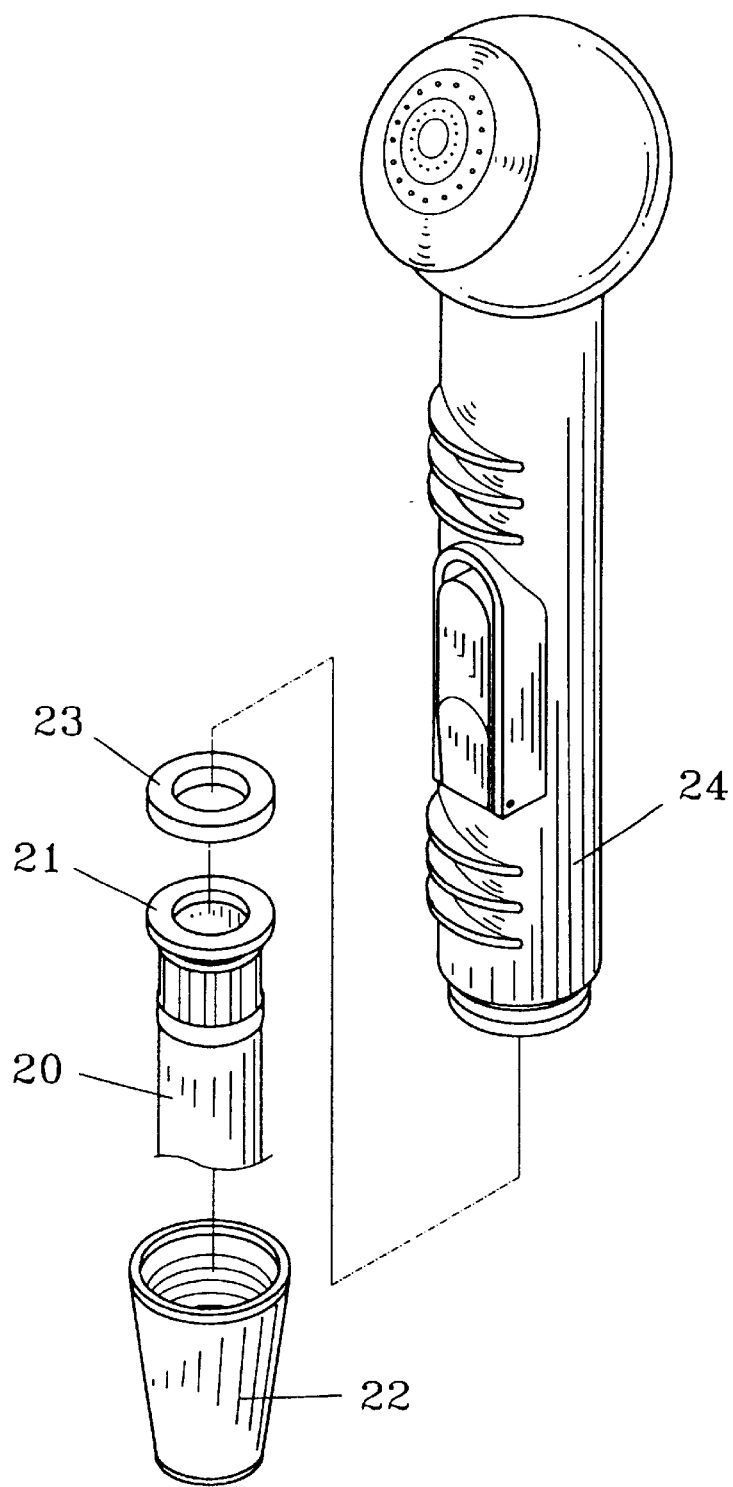
FIG. 4 is an exploded perspective view of a shower head with a conventional joint.
Figure 5:
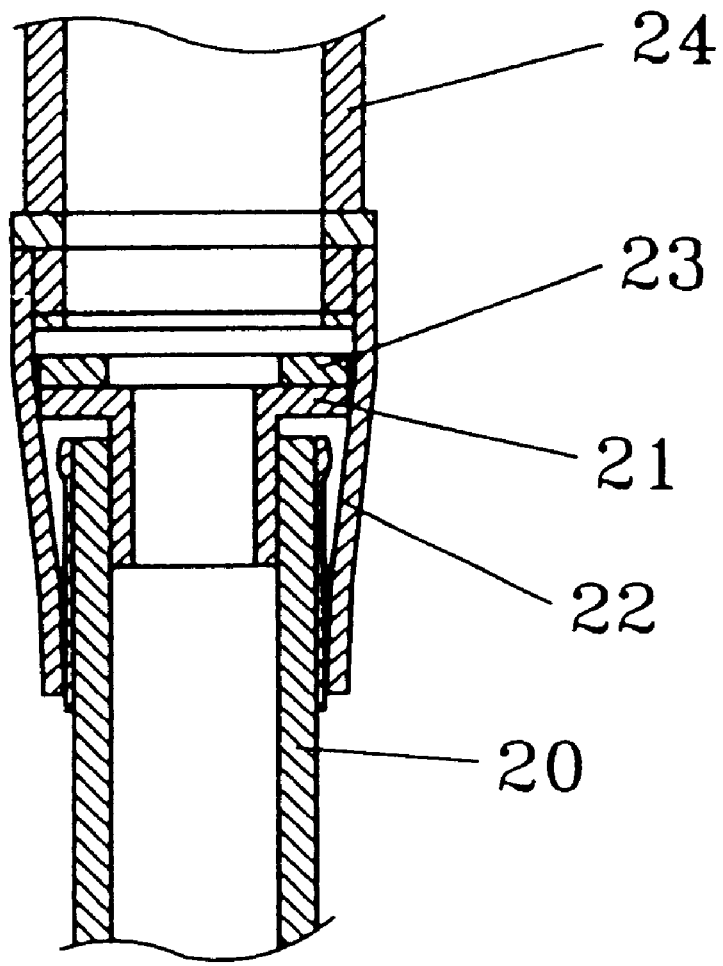
FIG. 5 is a partial longitudinal sectional view of the joint and a portion of the shower head in FIG. 4.

Referring to FIGS. 1 through 3, a universal joint in accordance with the present invention includes a water tube 10 with an end coupler 11 having an annular groove 110. A fitting 12 is mounted to the end coupler 11 of the water tube 10 and includes an inner periphery (not labeled). A stop flange 120 (FIG. 2) is formed on an end 121 of the inner periphery and a threading 122 is defined in the other end of the inner periphery. The threading of the fitting 12 is provided to engage with outer threading (not labeled) on an end 151 of a shower head 15. An anti-leak washer 13 is mounted in the annular groove 110 of the end coupler 11 of the water tube 10 and is in sealing contact with the inner periphery of the fitting 12, best shown in FIG. 2.

A sleeve 14 is mounted between the water tube 10 and the fitting 12. The sleeve includes a stop flange 140 on an outer periphery thereof. An end 141 (FIG. 1) of the sleeve 14 has an outer diameter smaller than an inner diameter of an end 121 of the fitting 12, thereby allowing the end of the sleeve 14 to be extended beyond the end 121 of the fitting 12, best shown in FIG. 2. The stop flange 140 of the sleeve 14 bears against the stop flange 120 of the fitting 12 to prevent damage. The anti-leak washer 13 is preferably conical and has a relatively larger end face, and an annular groove 130 is defined in the relatively larger end face to reduce rubber material and to improve the required anti-leak effect.

As illustrated in FIGS. 2 and 3, in assembly, the anti-leak washer 13 is mounted into the annular groove 110 of the end coupler 11, and the sleeve 14 is mounted into the fitting 12 with the reduced end 141 of the sleeve 14 extended through the end 121 of the fitting 12, such that the stop flange 140 of the sleeve 14 bears against the stop flange 120 of the fitting 12. Thus, the sleeve 14 is retained in place. Next, the fitting 12 and the water tube 10 are mounted around the water tube 10 with the end coupler 11 secured to an end of the water tube 10. The end 151 of the shower head 15 is then threadedly engaged with the inner threading 122 of the fitting 12. A portion of the sleeve 14 is sandwiched between the end coupler 11 and the stop flange 120 of the fitting 12.

It is noted that the shower head 15 and the water tube 10 are freely rotatable relative to each other to provide convenient use. In addition, the anti-leak washer 13 is mounted in the annular groove 110 of the end coupler 11 to prevent wear to the anti-leak washer 13 during rotation of the shower head 15. In addition, the sleeve 14 is mounted between the fitting 12 and the water tube 10 to prevent wear to the water tube 10 by the fitting 12. Further, extension of the sleeve 14 out of the fitting 12 prevents the water tube 10 to be damaged by end edge of the fitting 12.

Although the invention has been explained in relation to its preferred embodiment, it is to be understood that many other possible modifications and variations can be made without departing from the spirit and scope of the invention as hereinafter claimed.

What is claimed is:

1. A universal joint for a shower head, comprising:
   a water tube with an end coupler secured to an end thereof, the end coupler including an annular groove in an outer periphery thereof and a first stop flange;
   a fitting including a second stop flange on a first end of an inner periphery thereof and a threading defined in a second end of the inner periphery thereof, the fitting being mounted around the end coupler and the end of the water tube, the threading of the fitting being adapted to be engaged with an end of the shower head;
   an anti-leak washer mounted in the annular groove of the end coupler and in sealing contact with the inner periphery of the fitting; and
   a sleeve mounted between the end of the water tube and the fitting, the sleeve bearing against the first and second stop flanges to prevent movement thereof.

2. The universal joint for a shower head as claimed in claim 1, wherein the sleeve includes a third stop flange on an outer periphery thereof For bearing against the second stop flange of the fitting, and wherein the sleeve includes an end having an outer diameter smaller than an inner diameter of the first end of the fitting, thereby allowing the end of the sleeve to be extended beyond the first end of the fitting.

3. The universal joint for a shower head as claimed in claim 1, wherein the anti-leak washer is conical and includes a relatively larger end face, and an annular groove is defined in the relatively larger end face.

* * * * *